(12) United States Patent
Lee

(10) Patent No.: US 7,983,928 B2
(45) Date of Patent: *Jul. 19, 2011

(54) SYSTEMS AND METHODS FOR PREPARATION OF AN INTELLECTUAL PROPERTY FILING IN ACCORDANCE WITH JURISDICTION- AND/OR AGENT-SPECIFIC REQUIREMENTS

(76) Inventor: Eugene M. Lee, Annandale, VA (US)

( * ) Notice: Subject to any disclaimer, the term of this patent is extended or adjusted under 35 U.S.C. 154(b) by 93 days.

This patent is subject to a terminal disclaimer.

(21) Appl. No.: 12/489,882

(22) Filed: Jun. 23, 2009

(65) Prior Publication Data

US 2009/0327005 A1     Dec. 31, 2009

Related U.S. Application Data

(60) Division of application No. 11/348,310, filed on Feb. 7, 2006, now Pat. No. 7,574,367, and a continuation of application No. 09/409,524, filed on Sep. 30, 1999, now Pat. No. 7,016,851.

(51) Int. Cl.
G06Q 10/00    (2006.01)
G06Q 50/00    (2006.01)
(52) U.S. Cl. .................. 705/1.1; 705/310; 705/311
(58) Field of Classification Search ............. 705/1.1, 705/310, 311
See application file for complete search history.

(56) References Cited

U.S. PATENT DOCUMENTS

| | | | |
|---|---|---|---|
| 5,175,681 A | 12/1992 | Iwai et al. |
| 5,623,679 A | 4/1997 | Rivette et al. |
| 5,721,910 A | 2/1998 | Unger et al. |
| 5,737,557 A | 4/1998 | Sullivan |
| 5,754,840 A | 5/1998 | Rivette et al. |
| 5,819,092 A | 10/1998 | Ferguson et al. |
| 5,895,468 A | 4/1999 | Whitmyer, Jr. |
| 5,991,751 A | 11/1999 | Rivette et al. |
| 5,995,947 A | 11/1999 | Fraser et al. |
| 6,029,141 A | 2/2000 | Bezos et al. |
| 6,038,561 A | 3/2000 | Snyder et al. |
| 6,049,811 A | 4/2000 | Petruzzi et al. |
| 6,115,690 A | 9/2000 | Wong |
| 6,154,725 A | 11/2000 | Donner |

(Continued)

FOREIGN PATENT DOCUMENTS

JP     A-10-171843     6/1998

(Continued)

OTHER PUBLICATIONS http://www.inventnet.com, printed Jan. 22, 2003, 5 pages.

(Continued)

*Primary Examiner* — Jonathan Ouellette
(74) *Attorney, Agent, or Firm* — Posz Law Group, PLC

(57) ABSTRACT

A facility has been developed whereby an applicant (or his representative) may file corresponding applications in multiple jurisdictions using multiple associates while automating the preparation of filings in accordance with jurisdiction- and/or associate-specific requirements and/or procedures. An intellectual property filing portal or hub is employed, which in some realizations is hosted on public, packet switched data network and communicates with both applicants (or representatives) and associates. The intellectual property filing portal facilitates selection, by applicants (or representatives) of particular jurisdictions and associates based at least in part on fee quotations in accordance with particulars of an intellectual property filing and in accordance with fee structures of the particular jurisdictions and foreign associates. In addition, the intellectual property filing portal facilitates registration of associate- and jurisdiction-specific form documents and fee schedules for at least partially automated preparation of formal documents.

32 Claims, 3 Drawing Sheets

U.S. PATENT DOCUMENTS

| | | |
|---|---|---|
| 6,195,646 B1 | 2/2001 | Grosh et al. |
| 6,236,972 B1 | 5/2001 | Shkedy |
| 6,263,314 B1 | 7/2001 | Donner |
| 6,298,327 B1 | 10/2001 | Hunter et al. |
| 6,339,767 B1 | 1/2002 | Rivette et al. |
| 6,385,594 B1 | 5/2002 | Lebda et al. |
| 6,434,580 B1 | 8/2002 | Takano et al. |
| 6,499,026 B1 | 12/2002 | Rivette et al. |
| 6,549,894 B1 | 4/2003 | Simpson et al. |
| 6,574,645 B2 | 6/2003 | Petruzzi et al. |
| 6,604,135 B1 | 8/2003 | Rogers et al. |
| 6,606,744 B1 | 8/2003 | Mikurak |
| 6,662,178 B2 | 12/2003 | Lee |
| 6,694,331 B2 | 2/2004 | Lee |
| 6,789,092 B1 | 9/2004 | Oppedahl et al. |
| 6,877,137 B1 | 4/2005 | Rivette et al. |
| 7,016,851 B1 | 3/2006 | Lee |
| 7,016,852 B1 | 3/2006 | Lee |
| 7,117,443 B1 | 10/2006 | Zilka |
| 7,650,288 B2 | 1/2010 | Lee |
| 2001/0000044 A1 | 3/2001 | Lin |
| 2002/0035499 A1 | 3/2002 | Germeraad et al. |
| 2002/0040338 A1 | 4/2002 | Sick et al. |
| 2002/0059076 A1 | 5/2002 | Grainger et al. |
| 2002/0069154 A1 | 6/2002 | Fields |
| 2002/0073095 A1 | 6/2002 | Ohga |
| 2002/0082778 A1 | 6/2002 | Barnett et al. |
| 2002/0091542 A1 | 7/2002 | Grainger |
| 2002/0093528 A1 | 7/2002 | Grainger |
| 2002/0111824 A1 | 8/2002 | Grainger |
| 2002/0116363 A1 | 8/2002 | Grainger |
| 2002/0138297 A1 | 9/2002 | Lee |
| 2002/0138474 A1 | 9/2002 | Lee |
| 2002/0143760 A1 | 10/2002 | Kim et al. |
| 2002/0161733 A1 | 10/2002 | Grainger |
| 2003/0046307 A1 | 3/2003 | Rivette et al. |
| 2003/0191654 A1 | 10/2003 | Panchal |
| 2004/0230574 A1 | 11/2004 | Kravets |
| 2006/0259321 A1 | 11/2006 | Gabrick et al. |
| 2007/0005374 A1 | 1/2007 | Harkin |
| 2009/0307577 A1 | 12/2009 | Lee |

FOREIGN PATENT DOCUMENTS

| | | |
|---|---|---|
| JP | A-11-039394 | 2/1999 |
| JP | A-11-134399 | 5/1999 |
| WO | WO 98/26343 | 6/1998 |

OTHER PUBLICATIONS http://www.inventnet.com, printed Jan. 21, 2003, 11 pages.
http://www.lloydwise.com, printed Jan. 21, 2003, 21 pages.
Lasinski, M. and D. Davison, "Systems & Tools for Visualizing & Organizing IP Portfolios to Meet Business & Licensing Objectives," LES Annual Meeting, San Antonio, Texas, Oct. 27, 1999, 18 sheets.
Lucas, Carl, "Visualization of Intellectual Property: Visualization Framework, Patent Maps, Patent Trees," LES Annual Meeting, San Antonio, Texas, Oct. 27, 1999, 19 sheets.
Aureka 7.0: Open Platform for Intellectual Property Asset Management, materials distributed at 1999 LES Annual Meeting, San Antonio, Texas, Oct. 24-27, 1999, 18 pages.
Pruzin, Daniel, "WIPO Outlines Nine-Point Agenda for Tackling IP Protection on Internet," *Electronic Commerce & Law Report*, vol. 4, No. 36, BNA, Sep. 22, 1999, pp. 849-850.
Tapling, Peter, Aurigin, Presentation at Licensing Executives Society Michigan Chapter Meeting, Sep. 17, 1999, 32 pages.
Computer Packages, Inc., CPI Homepage, http://www.computerpackages.com, printed Jul. 28, 1999, 14 pages.
Herhold, Scott, "Patent War Pending: Once-arcane field emerges as battleground between online start-ups and established companies," *San Jose Mercury News*, Jul. 18, 1999, pp. 1-7.
Lovett, Wayne J., "Choosing the Right IP Software," *IP Worldwide*, Mar./Apr. 1999, pp. 31-34.
Lovett, Wayne J., "Special Report: The New Essentials for Managing IP: Choosing the Right IP Software," *IP Worldwide*, Mar./Apr. 1999, 11 pages.
Stephens, Keith, "Creating and Implementing the IP Plan," *IP Worldwide*, Mar./Apr. 1999, pp. 35-37.
"EPC & PCT forms," http://web.archive.org/web/19980703181993/www.epo.co.at/eop/formul/index.htm, printed Mar. 24, 2004, 11 pages.
"PTO Forms," http://web.archive.org/web/19900128095111/www.uspto.gov/web/forms, printed Mar. 24, 2004, 5 pages.
Stephens, Keith, "Creating and Implementing the IP Plan," *IP Worldwide*, Mar./Apr. 1999, 7 pages.
Woodbridge, Richard C. and Paul A. Gardon, "Selecting an IP Docket Management System," *Intellectual Property Today*, Jan. 1999, pp. 25-27.
http://web.archive.org/web/19980224075432/www.lightlink.com/bbm/, printed Mar. 24, 2005, 28 pages.
PCT-Easy, User Reference Manual, PCT-EASY V 2.80, WIPO (www.wipo.int/) Jan. 1999.
"Enabling the Virtual Enterprise: the Supply Chain Meets the Demand Chain," The Yankee Group, 1998.
http://web.archive.org/web/19981206010357/www.inventnet.com, printed Mar. 24, 2004, 11 pages.
Vollendorf, Stefanie, "IP Docketing Software—A Practical Tool," *Intellectual Property Today*, May 1998, pp. 54-56 and 58.
Dutton, Gail, "Protecting Intellectual Property," *Chemical Market Reporter*, Mar. 23, 1998.
http://web.archive.org/web/19961219063059/http://www.inventnet.com, printed Nov. 7, 1996, 14 pages.
Forstner, James A. "Managing international patent litigation," *Managing Intellectual Property Litigation Yearbook*, 1995, pp. 3-6.
Stallings, William, Ph.D., *"Computer Organization and Architecture"*, MacMillan Publishing Company, 1993, preface and contents, pp. iii-x.
Spohn, Darren L. *"Data Network Design"*, McGraw-Hill, Inc., 1993, contents and preface, pp. vii-xxx.
Gitlin, Richard D., Jeremiah F. Hayes, and Stephen B. Weinstein, *"Data Communications Principles"*, Plenum Press, 1992, preface and contents, pp. vii-xix.
Green, James Harry, *"The Irwin Handbook of Telecommunications"*, Irwin Professional Publishing, 2d ed., 1992, preface and table of contents, pp. iii-xv.
Gisler et al., eGovernment Experiences of the Swiss Federal Institute of Intellectual Property, IEEE Database and Expert Systems Applications, 2000 Proceedings, $11^{th}$ International Workshop, pp. 278-281, Sep. 4-8, 2000.
Cappellini et al., Copyright Protection of Cultural Heritage Multimedia Data through Digital Watermarking Techniques, IEEE Database and Expert Systems Applications, 2000 Proceedings, $11^{th}$ International Workshop, pp. 935-939, Sep. 4-8, 2000.

SYSTEMS AND METHODS FOR PREPARATION OF AN INTELLECTUAL PROPERTY FILING IN ACCORDANCE WITH JURISDICTION- AND/OR AGENT-SPECIFIC REQUIREMENTS

CROSS REFERENCE TO RELATED APPLICATIONS

This application is a Continuation of U.S. patent application Ser. No. 09/409,524 filed on Sep. 30, 1999, which is a divisional application of U.S. patent application Ser. No. 11/348,310 filed on Feb. 7, 2006.

BACKGROUND OF THE INVENTION

1. Field of the Invention

The invention relates generally to information systems and, more particularly, to systems and methods for preparing intellectual property filings in accordance with jurisdiction- and/or agent-specific requirements.

2. Description of the Related Art

In an increasingly interrelated world economy, many intellectual property owners seek protection for their intellectual property assets (e.g., as patents, trademarks, copyrights, designs, etc.) in multiple jurisdictions. For example, patent and trademark applications are routinely filed to secure protection of an invention or mark in multiple nations and/or regions. Often, corresponding applications are filed in, or designate, respective jurisdictions. Each application exhibits comparatively minor variations tracing to national, regional or convention requirements and preferences of associated counsel.

Unfortunately, intellectual property filings are initiated, prepared and filed in relatively crude fashion considering the advanced technologies that are the focus of many intellectual property practices. For example, preparation of the documents for filing is typically a manual process in most law firms. Even for filings corresponding to a priority filing (e.g., of a PCT international application corresponding to a priority national filing), preparation of documents is typically a manual process. As with most manual processes, mistakes, delays and inefficiencies may be introduced.

A common approach for securing international protection for patent and design intellectual property is to prepare and file a priority application to secure a priority date under various international conventions or treaties. Usually, such a priority application is filed in a home country although the priority application may, in some circumstances, be filed elsewhere (typically, in the United States or under an convention in a competent receiving office such as the International Bureau (IB) of the World Intellectual Property Organization (WIPO)). Thereafter, and within the appropriate convention period, multiple national filings must be made, claiming priority of the priority application. International filing conventions such as provided under the Patent Cooperation Treaty (PCT) or by the European Patent Convention (EPC) help to defer an eventual multiplicity of national filings; however, eventually multiple national filings are typically required.

Because of legal requirements for obtaining priority, the substance of national and international patent and design filings is typically identical to, or substantially equivalent to the disclosure of the priority applications upon which they are based. Filing papers and formal requirements may vary substantially, however. Accordingly, the act of filing an international, regional or national intellectual property application is typically dominated by logistical challenges such as proper formatting of an application, preparation of filing papers required by a national or regional intellectual property office, legalization of documents in accordance with national requirements, translation requirements, establishment of authority or agency in accordance with national requirements, and fee calculation and transaction issues. These complexities can be exacerbated by the differing procedures and requirements of various foreign associates (e.g., attorneys or agents authorized to practice in a given jurisdiction) with whom a managing attorney or intellectual property owner corresponds.

Trademark applications are similarly filed on a country-by-country basis or under a convention such as the Madrid Protocol. Multiple national filings are frequently made within a priority period, with subsequent filings in other countries.

In short, foreign filing departments of law firms and intellectual property owners are faced with a landscape of national requirements-based and foreign associate-based variations in formal or procedural requirements. In some cases, because of the timing of foreign filing decisions in relation to deadlines or determinations of rights, mistakes can be incurable and result in a loss of rights. Also, because of the sheer number of potential combinations, mistakes are easy to make. Furthermore, the effort necessary to maintain up-to-date forms and procedures can be substantial, particularly for multiple jurisdictions and with multiple foreign associates.

In part because of these logistical challenges, foreign filing decisions are not often made with particularity. Instead, standard selections of jurisdictions and foreign associates are routinized. Typically, such standard selections are followed with little, if any, consideration for the particulars of the intellectual property, the strengths (and weaknesses) of a particular foreign associate, matter specific implications of fee structures of standard jurisdictions and foreign associate selections, etc. What is needed are tools that facilitate IP portfolio exploitation by empowering decision makers to make and execute particularized filing decisions and thereby better optimize filing strategies.

One major need is for facilities to streamline filing of corresponding applications in multiple jurisdictions using multiple associates while automating the preparation of filings in accordance with jurisdiction- and/or associate-specific requirements and/or procedures. Another need is for facilities that allow fee transactions to be exactly quoted and executed in accordance with particulars of an intellectual property filing and in accordance with fee structures of jurisdictions and foreign associates.

Although these goals are yet to be realized, some useful software tools are beginning to reach the marketplace. For example, EP-EASY (Electronic Application SYstem) software available from the European Patent Office (EPO) enables applicants and their representatives to prepare and submit European patent applications in electronic form by creating an EP-EASY submission diskette. According to the EPO, future versions of the EP-EASY software will provide for the on-line filing of European patent applications; however, no on-line filing is currently provided.

A user of the EP-EASY software enters data into the interactive counterpart of the paper "Request for Grant" form (EPO Form 1001). The user may then "attach" technical documents, i.e., the description, the claims, the abstract and any drawings referred to in the description or claims, which have been independently prepared using an off-the-shelf word-processor and stored in a electronic format such as Portable Document Format (PDF), Rich Text Format (RTF) or ASCII text. The EP-EASY software copies these files to the EP-EASY submission diskette together with the files automatically generated by the EP-EASY software and creates a print-out of the EPO Form 1001E and attached files for filing with the submission diskette.

PCT-EASY (Electronic Application SYstem) software available from the World Intellectual Property Organization (WIPO) is similar and is designed to facilitate the preparation of PCT international applications in electronic form and according to WIPO, ultimately, facilitate the transfer of such applications by electronic means. However, at present, the PCT-EASY software is limited to (1) a Request form module providing for the input and validation of Request form data and the attachment of the abstract in electronic form, (2) printout of a PCT computer generated Request form, which replaces the existing PCT/RO/101 form for the purposes of a PCT-EASY filing, and (3) facilities for copying the PCT-EASY Request form data file and attached abstract to diskette for submission with the complete paper filing.

With regard to trademark applications, the United States Patent and Trademark Office (USPTO) has recently implemented electronic filing of trademark applications. The internet implementation of the Trademark Electronic Application Systems (e-TEAS) provides a HyperText Markup Language (HTML) form based interface to a USPTO trademark application form and allows direct electronic submission of a completed form to the USPTO.

SUMMARY OF THE INVENTION

Recognizing the limitations of currently available systems, a facility has been developed whereby an applicant (or his representative) may file corresponding applications in multiple jurisdictions using multiple associates while automating the preparation of filings in accordance with jurisdiction- and/or associate-specific requirements and/or procedures. An intellectual property filing portal or hub is employed, which in some realizations is hosted on a public, packet switched data network and communicates with both applicants (or representatives) and associates. In some realizations, the intellectual property filing portal facilitates selection, by applicants (or representatives) of particular jurisdictions and associates based at least in part on fee quotations made in accordance with particulars of an intellectual property filing and in accordance with fee structures of the particular jurisdictions and foreign associates. In addition, some realizations of the intellectual property filing portal facilitate registration of associate- and jurisdiction-specific form documents and fee schedules for at least partially automated preparation of formal documents.

In one embodiment in accordance with the present invention, an information system for transacting an intellectual property filing with plural targets includes a network and an intellectual property filing portal. The network includes an originating node and plural target nodes. The target nodes correspond to associates licensed or otherwise authorized to make intellectual property filings in one or more target jurisdictions. The intellectual property filing portal is coupled by the network to the originating and target nodes and is responsive to a selection at the originating node of at least one target jurisdiction and associate for the intellectual property filing, supplying the originating node with particularized requirements of the selected at least one target jurisdiction and associate. The intellectual property filing portal is further responsive to receipt via the network of one or more intellectual property filings prepared in accordance with the particularized requirements of the selected target jurisdictions and associates, supplying corresponding of the target nodes with respective portions of the received intellectual property filings for filing by respective of the selected associates in respective of the selected target jurisdictions.

In another embodiment in accordance with the present invention, a method of operating an intellectual property filing portal includes servicing intellectual property filing transactions using a network accessible information service, supplying the user, via the network, with a computer readable encoding of one or more form documents, and receiving from the user, via the network, at least a portion of a set of filing documents, and forwarding same to the selected associate for filing in the selected target jurisdiction. The supplying of a computer readable encoding of one or more form documents is responsive to a selection by a user of a target jurisdiction and associate and the form documents are specific to the target jurisdiction and associate. In one variation, the method includes registering associates for the making of intellectual property filings in respective target jurisdictions. The registering including updating a data store with computer readable encodings of form documents particular to an associate and one or more target jurisdictions.

In yet another embodiment in accordance with the present invention, a method of operating a one-stop intellectual property filing service includes servicing selections of two or more target jurisdictions and corresponding associates for an intellectual property filing; in response to the selections, supplying target jurisdiction and associate-specific documents for completion; receiving the completed target jurisdiction and associate-specific documents and technical documents; and forwarding the technical documents, together with respective of the target jurisdiction and associate-specific documents, to each of the selected associates for filing in respective of the selected target jurisdictions.

In still yet another embodiment in accordance with the present invention, a computer implemented method for initiating filing of one or more intellectual property related documents includes selecting one or more target jurisdictions from amongst a set of supported jurisdictions and for each selected target jurisdiction, obtaining a computer readable encoding of one or more form documents and supplying at least a portion of a set of filing documents, for transfer to the respective associate for filing in the selected target jurisdiction. The form documents are specific to the target jurisdiction and to a respective associate therefor.

In still yet another embodiment in accordance with the present invention, a computer implemented method for initiating filing of one or more intellectual property related documents includes selecting one or more target jurisdictions from amongst a set of supported jurisdictions and for at least one selected target jurisdiction, selecting from amongst one or more attorneys or agents available therefor. For each selected target jurisdiction, the method further includes transforming a computer readable encoding of intellectual property application data to a format consistent with requirements of the selected target jurisdiction and electronically transmitting the transformed computer readable encoding to an attorney or agent for filing in the selected target jurisdiction.

In still yet another embodiment in accordance with the present invention, a computer implemented method of preparing one or more intellectual property filings includes receiving a selection of one or more target jurisdictions from an originating computer system, supplying, responsive to the selection, the originating computer system with a computer readable encoding of filing requirements for the selected target jurisdictions and receiving in computer readable form, at least one document prepared at the originating computer system in accordance with the computer readable encoding of filing requirements.

In still yet another embodiment in accordance with the present invention, an information system for preparing intellectual property filings for at least one target in accordance with requirements therefor includes a selection facility by which a user thereof selects the at least one target; a retrieval interface to intellectual property application data stored; a retrieval interface to target requirement data; and a filing preparation facility. The filing preparation facility is responsive to the selection facility to, for each target selected by the user, transform the intellectual property application data into a target-specific intellectual property application filing format in accordance with the target requirement data and prepare at least one additional document in accordance with the intellectual property application and target requirement data. In one variation, the information system is embodied as a client application executable on a originating computer implementing the selection facility, the retrieval interface to intellectual property application data, the retrieval interface to target requirement data, and the translation facility and including a communications interface to a server application. At least the target requirement data is hosted by the server application.

In still yet another embodiment in accordance with the present invention, a computer program product is encoded in a computer readable medium. The computer program product includes selection code, retrieval code, document preparation code and filing initiation code. The selection code is executable to select one or more target jurisdictions and respective associates from amongst a set of target jurisdictions and associates therefor. The retrieval code is executable to retrieve, in accordance with the selection, a computer readable encoding of target jurisdiction- and associate-specific filing requirements. The document preparation code is executable to prepare one or more target jurisdiction- and associate-specific documents in accordance with the retrieved requirements. The filing initiation code is executable to transmit the prepared documents for filing by the selected one or more associates in the selected one or more target jurisdictions.

In still yet another embodiment in accordance with the present invention, a method of making a computer readable encoding of one or more target jurisdiction- and associate-specific form documents includes maintaining a data store of target jurisdiction- and associate-specific form documents for transacting an intellectual property filing in the target jurisdictions using respective of the associates; encoding, based on contents of the data store, an enumeration, for transmission to a computer, of at least a subset of the target jurisdictions and respective of the associates therefor; receiving a selection of one or more of the target jurisdictions and respective associates; retrieving, based on the selection, corresponding of the target jurisdiction- and associate-specific form documents; and encoding as a response to the selection for transmission to the computer, the retrieved target jurisdiction- and associate-specific form documents.

In still yet another embodiment in accordance with the present invention, an intellectual property filing preparation system includes means for selecting one or more target jurisdictions and respective associates; means for obtaining form documents specific to each selected target jurisdiction and associate; means for completing the obtained form documents in accordance with matter specific data; and means for transmitting a technical document and respective of the completed form documents for filing by the selected associates.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The invention is described herein with respect to various illustrative embodiments and implementation environments. Nonetheless, based on the description, persons of ordinary skill in the art will appreciate implementations suitable for other environments. The scope of the invention, as defined by the claims that follow, is not limited to any specific implementation environment.

Figure 1:
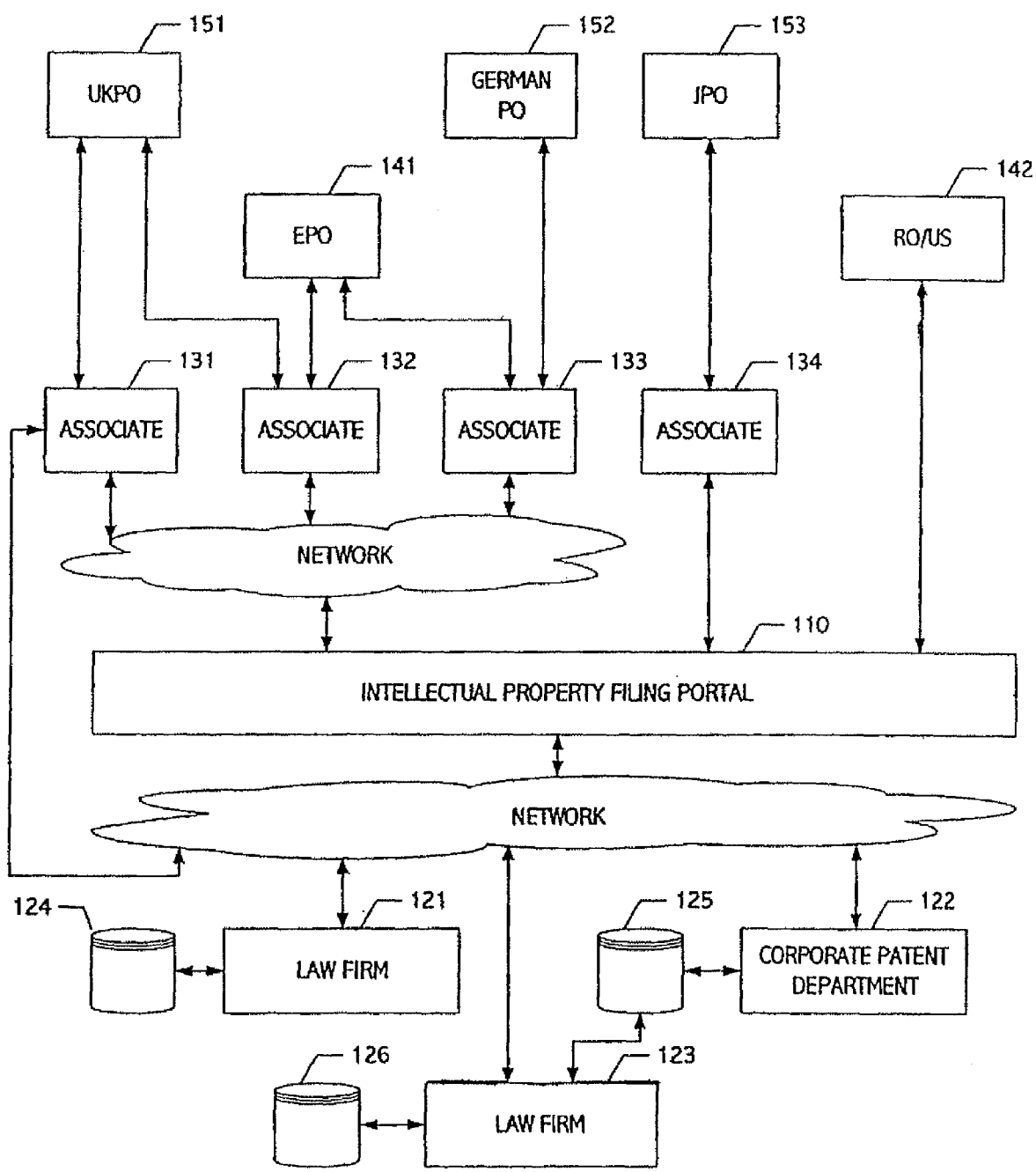
FIG. 1 is a block diagram depicting functional relationships between originating filers, an intellectual property filing portal, associates (including foreign attorneys and agents) and various patent-oriented intellectual property offices in accordance with an exemplary foreign-filing embodiment of the present invention.

FIG. 1 depicts an exemplary patent-oriented configuration of an international filing network in accordance with an exemplary embodiment of the present invention. Intellectual property filing portal 110 provides a central hub for facilitating filing transactions by associates (e.g., foreign associates and agents) in various patent-oriented intellectual property offices on behalf of originating filers (e.g., law firms, corporate patent departments and, in some configurations, applicants themselves). In general, associates (e.g., foreign associates and agents) register with intellectual property filing portal 110 to offer to originating filers (e.g., law firms and corporate patent departments) the service of filing counterpart foreign applications in respective jurisdictions where they are licensed or otherwise authorized to represent applicants. In an exemplary realization in accordance with FIG. 1, intellectual property filing portal 110 is hosted as a network accessible information service intermediary between computer systems of originating filers (e.g., originating filer systems 121, 122 and 123) and computer systems of service providing associates (e.g., associate systems 131, 132 and 133).

Originating filers select from amongst the target jurisdictions supported and from amongst associates offering filing services therein. Once target jurisdictions and associates are selected by an originating filer, transactions between the originating filer and its selected associates are performed largely electronically, via intellectual property filing portal 110. As will be described in greater detail below, intellectual property filing portal 110 supplies transaction specific fee information, target jurisdiction- and associate-specific form documents and, in some configurations, target jurisdiction filing requirements to originating filers. In some configurations, detailed instructions for completion of form documents and/or legalization of documents are also provided. Originating filers complete target jurisdiction- and associate-specific form documents and return them together with technical documents (e.g., the specification, claims and abstract of a patent application) for transmission to the corresponding selected associates for filing in selected target jurisdiction.

In some configurations, originating filer systems 121, 122 and/or 123 may retrieve matter specific information, technical documents, etc. in computer readable form from data stores (e.g., data stores 124, 125 and/or 126) to at least partially complete a set of filing documents. In general, such information and documents may be retrieved from local and/or remote stores, network information services, file servers, and/or applications with callable interfaces such as database management systems, docket systems, document management systems, etc. In addition, in some configurations (not specifically shown), at least some of such information and documents may be stored by intellectual property filing portal 110. For example, in one implementation, intellectual property filing portal 110 is integrated with a docket system and target jurisdiction- and associate-specific form documents are supplied already populated with matter specific information.

In the configuration of FIG. 1, using software executing on originating filer systems 121, 122 and/or 123, matter specific information and technical documents can be automatically retrieved from data stores to populate the target jurisdiction- and associate-specific form documents with matter-specific information and technical documents can be automatically formatted in accordance with jurisdiction-specific formal requirements supplied by intellectual property filing portal 110. In this way, a complete set of documents is prepared for each selected target jurisdiction including associate-specific filing papers, powers of attorney, authorizations, etc. Depending on the requirements of a particular selected jurisdiction, signature documents may be printed, signed, scanned and forwarded electronically (e.g., as a file transferred over the internet) with a complete set of filing documents. Alternatively, original signature documents may be printed, signed and physically delivered if necessary. In typical configurations, at least a portion of the set of filing documents is forwarded electronically by intellectual property filing portal 110 to information systems of the selected associates (e.g., associate systems 131, 132, 133 and/or 134). In some configurations, filing directly with an intellectual property office, e.g., with a competent receiving office under the Patent Cooperation Treaty, is provided when an associate/agent is either not required under applicable regulations or when an attorney or agent of the originating filer may himself or herself act as the agent for such a filing.

In an exemplary configuration, intellectual property filing portal 110 includes a network information service component, e.g., a web server, coupled via a communication network, e.g., the internet, to client applications, e.g., web browsers, of originating filers. Such client applications executing on originating filer systems 121, 122 and 123 typically communicate with intellectual property filing portal 110 over public data networks such as the internet using industry standard protocols, preferably using privacy enhanced protocols such as Secure Sockets Layer (SSL), HTTPS or with Virtual Private Networking (VPN); however, in some configurations or for some originating filer systems, dial-up communications, dedicated circuits or even physical transfer of computer readable media may be employed. A web server and browser based interface is presently preferred (1) for ease of use, (2) because information protocols, user interface techniques and information security implementations are mature and widely available for implementation of systems in accordance with the present invention, and (3) because of the increasingly ubiquitous nature of browser technology. However, other application interfaces, including custom interfaces, are also suitable. Based on the description herein, persons of ordinary skill in the art will appreciate suitable implementations using browser and non-browser based application platforms.

In addition, although some aspects of some configurations of intellectual property filing portal 110 are described herein in the context of a traditional client/server configuration, other realizations need not employ a client/server paradigm. Indeed, portions of the functionality described herein with reference to intellectual property filing portal 110 may be replicated and provided at originating filer systems 121, 122 and 123. For example, in one realization in accordance with some embodiments of the present invention, target jurisdiction- and associate specific form documents, fee schedules, requirements, etc. may be distributed to originating filer system installations. Distribution of such documents, schedules, requirements, etc. may be by periodic delivery of computer readable media (e.g., CD-ROM, disks, etc.) or through a network update facility. Alternatively, directory information (e.g., for associates and target jurisdictions for which the associates provide filing services) including Universal Resource Locators (URLs) and access credentials may be distributed to originating filer system installations and documents, schedules, requirements, etc. may be hosted by individual of the associate systems. Furthermore, combinations of the above described approaches may be employed. Based on the description herein, persons of ordinary skill in the art will appreciate suitable implementations for the particular needs of particular originating filer and associate communities.

In addition to the originating filer portion of an international filing network, FIG. 1 illustrates an exemplary associate and target jurisdiction portion thereof. For clarity of illustration and description, only a small number of associates and regional and national patent offices (e.g., United Kingdom Patent Office 151, European Patent Office 141, German Patent Office 152, Japanese Patent Office 153 and United States Patent and Trademark Office acting as the Receiving Office 142 under the Patent Cooperation Treaty for the United States) are represented. However, based on the description herein, persons of ordinary skill in the art will appreciate the advantages of much larger international filing networks, including at least one associate for each significant target jurisdiction and including larger numbers of associates for most target jurisdictions.

In general, an associate prepares filing papers (typically as form documents) and/or instructions for each of the jurisdictions for which it offers filing services. Form documents may be specific to the target jurisdiction, the associate or both. In addition, an associate typically supplies formal requirements (e.g., required document format, languages, applicant restrictions, etc.) for the target jurisdictions in which it offers its filing services and supplies fee schedule information including both its own fees and those applicable to the target jurisdictions. Preferably, target- and associate-specific requirements, including form documents, formal requirements and fee schedules are supplied in computer readable form by information systems of the respective associates to intellectual property filing portal 110 and maintained by the respective associates via a network. When a network communications interface is available, intellectual property filing portal 110 may forward at least a portion of the set of filing documents received from an originating filer system to the corresponding selected associate. However, where necessary, such requirements, form documents and fee schedules can be supplied in computer readable form by disk or other transfer mechanism or entered into data stores accessible to intellectual property filing portal 110 based on written materials received from the associate.

As illustrated in FIG. 1, a particular associate and hence a networked information server for such an associate (see e.g., associate system 132) may service filings for more than one target jurisdiction. Similarly, more than one associate and hence more than one networked information server may service a given target jurisdiction. For example, in the illustration of FIG. 1, associate system 132 offers filing services for the United Kingdom through UKPO 151 and for European Patent Convention filings through EPO 141. In contrast, associate 131 offers filing services only for the United Kingdom.

Typically, a law firm will have the option of interacting with intellectual property filing portal 110 both as an originating filer and as an associate. For example, the information systems 131 of an illustrated UK associate services filings into United Kingdom Patent Office 151 but also interacts with intellectual property filing portal 110 as an originating filer to allow filings via intellectual property filing portal 110 as described above (e.g., in German Patent Office 152 via information systems 133 of the illustrated German associate). Accordingly, although the intellectual property filing system is illustrated in the context of single direction flows of filings, persons of ordinary skill in the art will appreciate that, at least in some realizations, intellectual property filing portal 110 provides a fully bi-directional filing capability.

Figure 2:
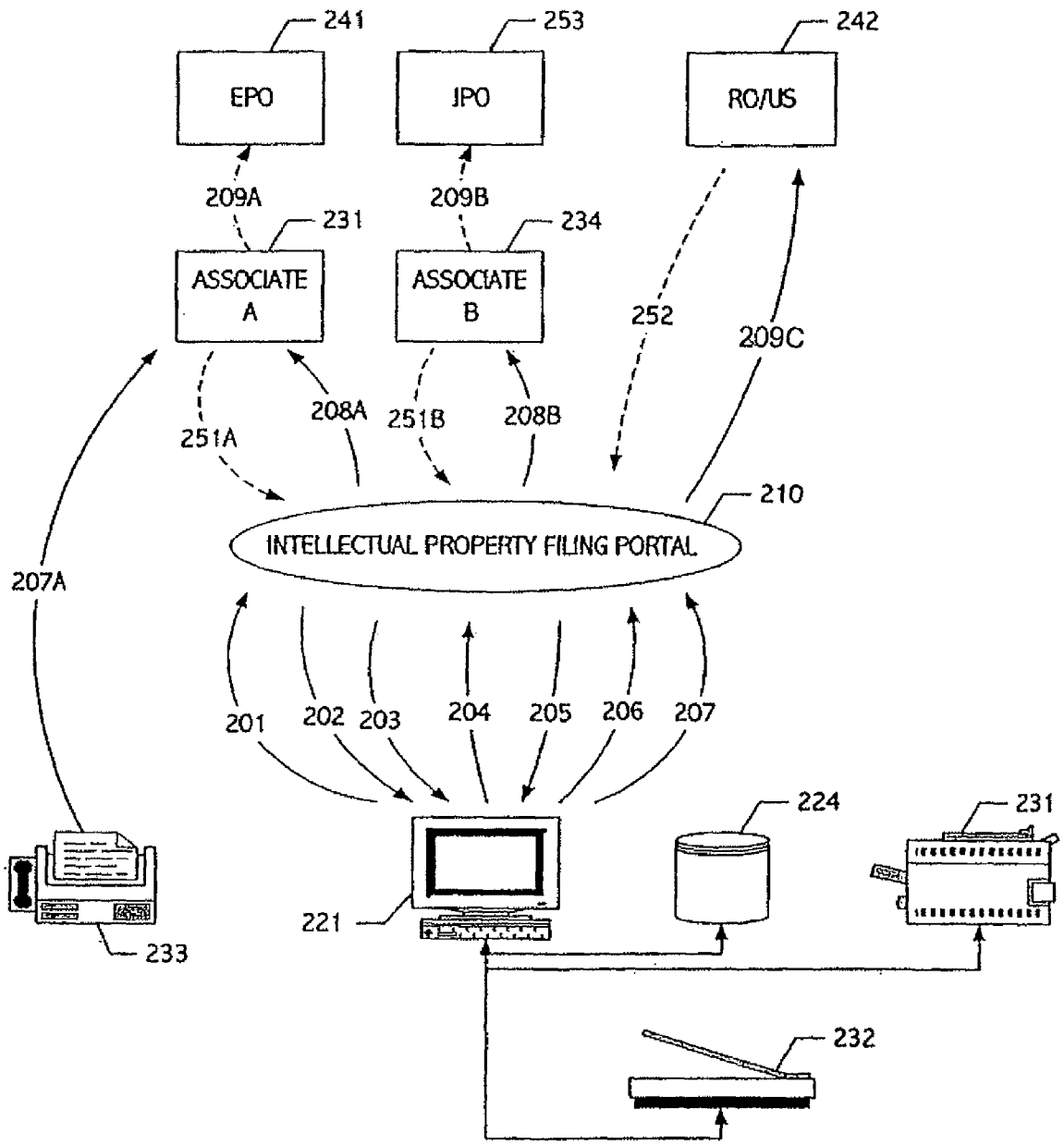
FIG. 2 depicts information flows between an originating computer system configuration, an intellectual property filing portal, associates (including foreign attorneys and agents) and various patent-oriented intellectual property offices in accordance with an exemplary embodiment of the present invention.

Referring now to FIG. 2, a single originating filer application is illustrated executing on workstation 221. In an illustrative configuration, the originating filer application communicates with an intellectual properly filing portal 210 implemented as an information service executing on a networked information server via a communication network, preferably a public, packet-switched data network with Virtual Private Networking (VPN) support. In the illustration of FIG. 2, two intellectual property filings are processed. Each is transacted via the network and intellectual property filing portal 210; however the first is filed 209A with European Patent Office 241 and 209B with Japanese Patent Office 253 after being transacted with information systems 231 and 234 of respective European and Japanese associates. The second is transacted without an associate intermediary and is filed 209C directly in the United States Patent and Trademark office acting as receiving office 242 under the Patent Cooperation Treaty.

A foreign filing session is initiated (201) by authenticating and requesting target jurisdiction and associate information from intellectual property filing portal 210. In response, intellectual property filing portal 210 supplies (202) a listing or other computer readable encoding of target jurisdictions and corresponding associates currently registered. For the sake of illustration, we assume that (as illustrated in FIG. 1) two associates are available for filings in the European Patent Office and a single associate is available for filings in the Japanese Patent Office. Further, we assume that virtually all significant regional and national offices are supported with at least one corresponding associate. Given these assumptions, intellectual property filing portal 210 may supply workstation 221 with a rather extensive listing of target jurisdictions and associates for presentation to the user. Possible selections may be presented to the user using any suitable user interface technology.

In some configurations, intellectual property filing portal 210 supplies or otherwise provides access to additional information that may facilitate selection, by a user at workstation 221, of particular associates and target jurisdictions. For example, intellectual property filing portal 210 may supply descriptive information for an associate as well as information such as summaries of national filing requirements and scope of protections available to facilitate evaluation by the user of foreign filing alternatives. Intellectual property filing portal 210 also supplies (203) fee and/or cost information descriptive of both target jurisdiction and associate fees and/or costs. Preferably, such information includes all fees and costs associated with filing a particular intellectual property application in the selected target jurisdiction. In some implementations, such information is parameterized with respect to particulars of the intellectual property filing, e.g., independent and total claim counts, page counts, designations (for regional or convention applications), applicant particulars, related matter particulars, subject matter categories, etc. In some implementations, estimates of prosecution costs may also be supplied.

In any case, based at least in part on information supplied by intellectual property filing portal 210, the user of workstation 221 selects (204) a particular set of target jurisdictions and corresponding associates for the filing of a particular intellectual property application. For example, in the illustrative case, the user selects one of the two available associates for filing in the European Patent Office (EPO) and selects the only available associate for filing in the Japanese Patent Office (JPO). In response to the user's selection (204), intellectual property filing portal 210 supplies (205) workstation 221 with target- and associate-specific requirements, including form documents, formal requirements and fee schedules for each of the selected associate and target jurisdiction combinations (in this case, for filing by associate A in the EPO and by associate B in the JPO).

Typically, formal documents are supplied in a computer readable encoding such that application software on workstation 221 may populate the formal documents with matter specific data (e.g., docket data, originating agent data, etc.) retrieved from a data store. As before, particular implementations may employ local and/or remote stores, network information services, file servers, and/or applications with callable interfaces such as database management systems, docket systems, document management systems, etc. in the role of data store 224. In some configurations in accordance with the present invention, preparation of formal documents based on matter specific data is automated and occurs with little or no user interaction subsequent to the selection (204) of target jurisdictions and corresponding associates. In other configurations, at least some manual entry of data into the form documents may be required. In either case, once formal documents are finalized (either automatically or with manual intervention), the user authorizes (206) the intellectual properly filings in the selected target jurisdictions using the selected associates.

Coincident with the authorization, application software executing on workstation 221 transmits (207) at least some of the filing documents to intellectual property filing portal 210. Preferably, all filing documents (including completed and digitally signed formal documents and technical documents retrieved from data store 224) are transmitted to intellectual property filing portal 210. However, in some configurations, some of the documents are printed (e.g., using printer 231), signed and transferred in hardcopy form to the corresponding associate. In situations where original signatures are required, an overnight courier may be employed. Alternatively, if consistent with the requirements of a particular target jurisdiction, signed formal papers may be faxed (233), or scanned (232) and transmitted electronically, to the corresponding associate.

Intellectual properly filing portal 210 receives (207) the user's authorization (including a fee authorization) and at: least some of the filing documents from workstation 221 and, in turn, forwards (208A, 208B) a respective one (or ones) of the filing documents to the appropriate associates for filing. Preferably, (the forwarding is in computer readable form so that, if available in the corresponding target jurisdiction, filings can be made electronically by the corresponding associates. However, for at least some associates and presently for all patent offices, it is expected that filing documents will be transmitted in hard copy form. Intellectual property filing portal 210 maintains as part of its associate registrations a computer readable encoding of suitable transmission means.

In a representative configuration, target- and associate-specific requirements, including form documents, formal requirements and fee schedules supplied (205) by intellectual property filing portal 210 are previously supplied (251A, 251B, 252) in computer readable form by respective associates. Alternatively, such information may be maintained by the respective associates and retrieved on demand by intellectual property filing portal 210 in response a particular user's foreign filing session. Suitable storage configurations for target- and associate-specific requirements data may vary from associate to associate.

Figure 3:
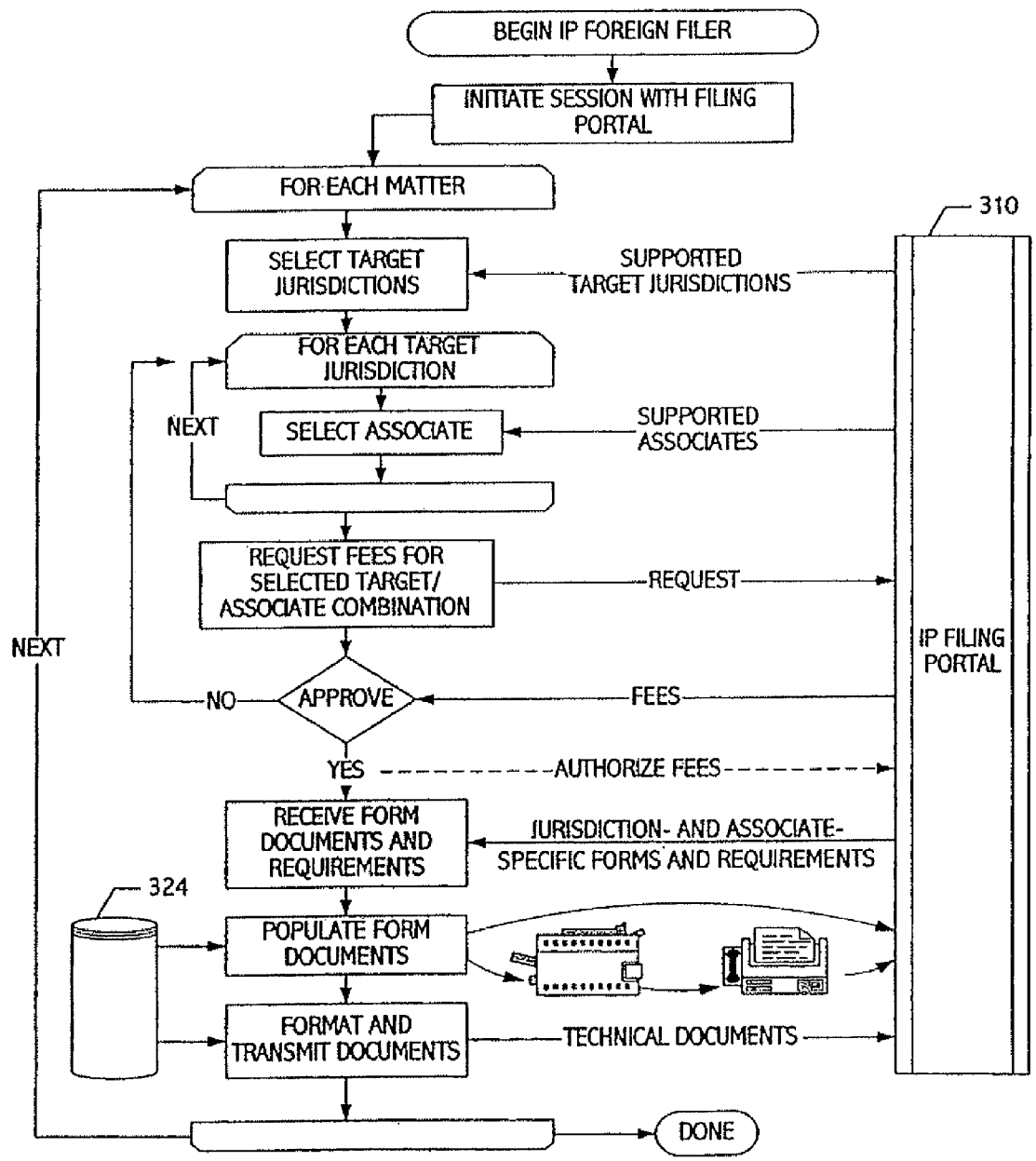
FIG. 3 is a flow chart illustrating a control and data flows within and between an originating information system and an intellectual property filing portal in accordance with an exemplary interaction between the originating information system and the intellectual property filing portal.

FIG. 3 illustrates exemplary originating filer side data and control flows in an intellectual property filing configuration in accordance with an embodiment of the present invention. Specifically, after initiating a session with the filing portal, the originating filer side application performs, for each matter to be foreign filed, a selection of target jurisdiction and of associate. In each case, an encoding of target jurisdictions and associates is supplied by intellectual property filing portal 310. Once target jurisdictions and associates are selected, the originating filer side application requests corresponding fee quotations. If the fees quoted by intellectual property filing portal 310 are approved, a fee transaction is authorized (e.g., by debit account, wire transfer, etc.) and preparation of formal document is begun. If not, the user may reselect target jurisdiction and/or associates. Assuming that fees are approved and that the fee transaction is successful, the intellectual property filing portal 210 sends, and the originating filer application receives, jurisdiction- and associate-specific forms and requirements for each of the selected target jurisdiction and associate combinations. As before, form documents and requirements are supplied in computer readable form to facilitate automated preparation of documents by the originating filer application.

Typically, the received form documents are populated with information from a local data store (e.g., docket data and priority document data store 324). Because the form documents are target jurisdiction- and associate-specific, once completed (i.e., populated with data) and signed, they are suitable for filing with technical documents by the associate in the target jurisdiction. In some cases, particular formal requirements may affect technical documents as well. In such cases, the received computer readable encoding of formal requirements allows the originating filer-side application to perform minor formatting on patent application data (e.g., on a target-neutral computer readable encoding of a priority application). For example, margins and page numbering may be conformed to the formal requirements. In addition, for technical documents encoded in target neutral formats that encode metadata (e.g., as SGML/XML tags), section headings may be conformed to formal requirements as well. Alternatively, in some configurations, the originating filer-side application may prompt the user to make changes manually in accordance with the received formal requirements. In any case, technical documents and, now completed, target jurisdiction- and associate-specific form documents are transmitted to intellectual property filing portal 310 for forwarding on to the selected associates for filing. As previously described, the entire set of filing documents is preferably encoded in computer readable form and transmitted electronically to intellectual property filing portal 310. However, for some target jurisdictions, at least some of the formal documents may need to be printed, signed and transmitted in hard copy form. Alternatively, electronically transmitted facsimiles may be suitable.

White the invention has been described with reference to various embodiments, it will be understood that these embodiments are illustrative and that the scope of the invention is not limited to them. Many variations, modifications, additions, and improvements are possible and will be appreciated by persons of ordinary skill in the art based on the description herein. For example, although patent intellectual property filings have been used to facilitate description of features, advantages and capabilities with respect to specific filing situations, realizations in accordance with the present invention may be configured to support other intellectual property filings (e.g., to secure trademarks or copyrights). Some realizations may support filings for multiple forms of intellectual property. Some realizations need not patent intellectual property filings. Also, although application filings have been described for illustrative purposes, embodiments in accordance with the present invention may be configured to include other filings such as during prosecution of an application or post issuance. Similarly, although foreign filings have been emphasized, some configurations in accordance with the present invention may be employed to facilitate filing networks wholly within a single country.

More generally, plural instances may be provided for components described herein as a single instance. Boundaries between various components, services, applications, and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. Similarly, structures and functionality presented as a single component may be distributed amongst plural components. Persons of ordinary skill in the art will appreciate allocations of structures and functionality suitable to particular implementation environments, interface constraints and desired product and/or service configurations. These and other variations, modifications, additions, and improvements may fall within the scope of the invention as defined in the claims that follow.

What is claimed is:

1. A method of operating an information service to facilitate preparation of intellectual property documents suitable for filing in one or more of plural target jurisdictions, the method comprising:

registering for each of plural associates, at least one target jurisdiction and a computer readable encoding of a plurality of form documents corresponding to target jurisdiction and associate specifications therefore wherein the form documents include fields defined for completion of matter-specific information;

distributing at least a portion of the form documents to an originating filer for use in preparation of the intellectual property documents suitable for filing by respective ones of the associates, wherein the distribution is at least one of (i) responsive to selection by the originating filer of one or more of the target jurisdictions and, for each selected target jurisdiction, a respective one of the associates, and (ii) periodic supply to the originating filer of the computer readable encoding of at least a portion of the form documents for each of plural associates;

receiving filing documents from the originating filer, wherein the filing documents comprise at least a portion of the form documents completed with matter-specific information from the originating filer; and automatically determining, by a computer, responsive to the filing documents, respective associates for receipt of the filing documents, and forwarding the filing documents to the respective associates.

2. The method of claim 1, further comprising the step of distributing, with the plurality of form documents, computer-executable formatting instructions, for the at least one target jurisdiction, for causing automatic formatting of technical documents associated with a particular matter; and receiving, with the filing documents, matter-specific technical documents in accordance with the formatting instructions.

3. The method of claim 1, further comprising the steps of calculating, for respective ones of the associates, based on the filing documents received from the originating filer, at least one of the associate fee and government fee for filing the documents; transmitting the at least one fee to the originating filer; and receiving an authorization from the originating filer for respective ones of the associates, prior to forwarding the filing documents to the authorized respective ones of the associates.

4. The method of claim 1, further comprising receiving, from the originating filer, a computer readable encoding of intellectual property application data, and transforming the data for a format consistent with the requirements of the target jurisdiction and transmitting the transformed encoding to the respective associates.

5. An information system for transacting an intellectual property filing with plural targets therefor, the information system comprising:

a network including an originating node and plural target nodes, the target nodes corresponding to associates licensed or otherwise authorized to make intellectual property filings in one or more target jurisdictions; and an intellectual property filing portal coupled by the network to the originating node and at least a portion of the target nodes, the intellectual property filing portal responsive to a selection at the originating node of at least one target jurisdiction and at least one associate corresponding thereto for the intellectual property filing, automatically supplying the originating node with particularized requirements of the selected at least one target jurisdiction and at least one associate, the intellectual property filing portal further responsive to receipt via the network of one or more intellectual property filings prepared in accordance with the particularized requirements of the selected at least one target jurisdiction and at least one associate, supplying corresponding ones of the target nodes with respective portions of the received one or more intellectual property filings for filing by respective ones of the selected at least one associate in respective ones of the selected at least one target jurisdiction.

6. The information system of claim 5,
wherein the selection at the originating node includes selection of two or more target jurisdictions.

7. The information system of claim 5, wherein for each selected at least one target jurisdiction and corresponding at least one associate, the particularized requirements include:

formatting requirements for filing of the intellectual property filing in the target jurisdiction; and an encoding of at least one filing suitable for filing at the target jurisdiction.

8. The information system of claim 5, wherein for each selected at least one target jurisdiction and corresponding at least one associate, the particularized requirements include:

information characterizing one or more data fields for which values specific to the intellectual property filing are to be supplied from the originating node to allow preparation of documents for filing in the selected at least one target jurisdiction by the selected at least one associate.

9. The information system of claim 5, wherein for each selected at least one target jurisdiction and corresponding at least one associate, the particularized requirements include:

an encoding of at least one paper required by the selected at least one associate.

10. The information system of claim 5, wherein the originating node includes a computer of a managing attorney or intellectual property owner; and wherein at least a portion of the target nodes include a computer of respective associate configured to electronically receive at least a portion of the intellectual property filing from the originating node via the intellectual property filing portal.

11. The information system of claim 5, wherein the originating node includes a web browser;

wherein in the intellectual property filing portal includes a web server; and wherein the selection of at least one target jurisdiction and at least one associate, the supplying of the particularized requirements, and the receipt of the one or more intellectual property filings prepared in accordance with the particularized requirements are achieved, at least in part, using internet protocol traffic between the web browser and the web server.

12. The information system of claim 5, wherein the intellectual property filing portal is further responsive to registration by one or more of the associates of particularized requirements for the corresponding at least one target jurisdiction;

wherein the supplied particularized requirements include those registered by the selected at least one associate.

13. The information system of claim 5, wherein the network includes one or more of a packet switched network segment, a circuit switched network segment, a public network segment, a private network segment, a public switched telecommunications network segment, and a virtual private network.

14. The information system of claim 5, wherein the received intellectual property filings include one or more of:

a computer readable encoding of a technical document including specification and claims formatted in accordance with the supplied particularized requirements of at least a first of the selected target jurisdictions; and a computer readable encoding of information for completion of a filing paper, request for examination or transmittal in accordance with the supplied particularized requirements of the first selected target jurisdiction and the selected associate therefore.

15. A method of operating an intellectual property filing portal for servicing intellectual property filing transactions using a network accessible information service, the method comprising:

responsive to a selection by a user of at least one target jurisdiction and at least one associate corresponding thereto, supplying the user, from the information service via the network, with a computer readable encoding of one or more form documents, wherein the form documents are specific to the at least one target jurisdiction and at least one associate and wherein the form documents include fields defined for completion of matter-specific information; and receiving from the user, at the information service via the network, one or more documents suitable for filing completed with matter-specific information for a corresponding matter, and in accordance with the one or more form documents, automatically determining, by a computer, the at least one associate corresponding thereto, and forwarding same to the selected corresponding at least one associate for filing in the selected at least one target jurisdiction.

16. The method of claim 15, further comprising:
registering one or more associates for the making of intellectual property filings in respective one or more target jurisdictions, the registering including updating a data store with computer readable encodings of one or more form documents specific to at least one associate and the respective at least one target jurisdiction.

17. The method of claim 15, further comprising:
providing one or more quoted fees associated with both the at least one target jurisdiction and the at least one associate, wherein the supplying of the computer readable encoding of one or more form documents is contingent upon authorization by the user of the quoted fees.

18. The method of claim 15, further comprising:
providing one or more quoted fees associated with both the at least one target jurisdiction and the at least one associate substantially coincident with the selection; and
transacting the quoted fees substantially coincident with the one or more of the selection, the receiving of one or more documents and the filing in the selected target jurisdiction.

19. The method of claim 18,
wherein the transacting includes one or more of debiting a deposit account, executing a wire transfer, and electronically authorizing payment of the quoted fees using a credit card, debit card or other payment system.

20. The method of claim 15, further comprising:
responsive to the selection by the user of the at least one target jurisdiction and the at least one associate corresponding thereto, retrieving a computer readable encoding of target jurisdiction filing requirements for technical documents;
retrieving a computer readable encoding of at least one technical document for the corresponding matter; and
preparing transforming the at least one technical documents of the one or more documents suitable for filing in accordance with the target jurisdiction filing requirements for technical documents.

21. The method of claim 20, further comprising:
supplying the user, via the network, with the computer readable encoding of target jurisdiction filing requirements for technical documents;
performing the preparing at the user's site using the computer readable encoding of target jurisdiction filing requirements;

receiving from the user, via the network, the prepared one or more technical documents complying with the target jurisdiction filing requirements; and
forwarding the one or more technical documents, together with the documents suitable for filing, to the corresponding at least one associate.

22. A computer implemented method for initiating filing of one or more intellectual property related documents, said method comprising:
selecting two or more target jurisdictions from amongst a set of supported jurisdictions; and
responsive to each selected target jurisdiction,
obtaining a computer readable encoding of one or more form documents, wherein the one or more form documents are specific to the target jurisdiction and to a respective associate therefor; and
supplying at least a portion of a set of filing documents in accordance with the one or more form documents, for transfer to the respective associate suitable for filing in the selected target jurisdiction,
wherein the obtaining is from an intellectual property filing portal; and
wherein the supplying for transfer includes supplying a computer readable encoding to the intellectual property filing portal for forwarding to the respective associate.

23. The computer implemented method of claim 22, further comprising for each selected target jurisdiction:
completing the one or more form documents in accordance with matter specific information retrieved from a data store.

24. The computer implemented method of claim 22, further comprising:
selecting the respective associate from amongst a set of supported associates.

25. The computer implemented method of claim 22,
wherein the obtaining and the supplying are via a network; and
wherein the supplied portion of the set of filing documents includes at least a computer readable encoding of one or more technical documents.

26. The computer implemented method of claim 22,
wherein the supplied portion of the set of filing documents includes one or more technical documents and completed ones of the one or more form documents.

27. A computer implemented method for initiating filing of one or more intellectual property related documents, said method comprising:
selecting one or more target jurisdictions from amongst a set of supported jurisdictions;
for at least one selected target jurisdiction, selecting from amongst one or more attorneys or agents available therefor; and
for each selected target jurisdiction,
automatically transforming, by a computer, a computer readable encoding of intellectual property application data to a format appropriate for filing and consistent with requirements of the selected target jurisdiction, the transforming being in accordance with a computer readable encoding of filing requirements for the selected target jurisdiction; and electronically transmitting the transformed computer readable encoding to an attorney or agent for filing in the selected target jurisdiction, wherein the electronically transmitting is via an information service intermediary; and further comprising receiving from the information service intermediary at least the computer readable encoding of filing requirements for the selected one or more target jurisdictions, and wherein the transforming is performed by the information service intermediary.

28. The method of claim 27, wherein the transforming is further in accordance with a computer readable encoding of the selected attorney or agent's requirements.

29. The method of claim 27, wherein the intellectual property application data includes contents of a priority application.

30. The method of claim 27, wherein the intellectual property application data includes data retrieved from a docket system.

31. The method of claim 27, wherein the one or more intellectual property related documents include at least one of an intellectual property application, an amendment, a transmittal paper, an appointment of agent, and a legalization paper.

32. The method of claim 27, further comprising:

representing the intellectual property application data in a target-neutral format prior to the transforming thereof.

* * * * *